United States Patent
Miura et al.

(10) Patent No.: US 10,633,733 B2
(45) Date of Patent: Apr. 28, 2020

(54) HIGH-NITROGEN STAINLESS-STEEL PIPE WITH HIGH STRENGTH HIGH DUCTILITY, AND EXCELLENT CORROSION AND HEAT RESISTANCE

(75) Inventors: Harumatu Miura, Takarazuka (JP); Kazuo Oda, Yamaguchi (JP)

(73) Assignees: HARUMATU MIURA, Takarazuka-Shi, Hyogo (JP); ODA INDUSTRIES CO., LTD., Abu-Gun, Yamaguchi (JP)

(*) Notice: Subject to any disclaimer, the term of this patent is extended or adjusted under 35 U.S.C. 154(b) by 1388 days.

(21) Appl. No.: 13/577,173

(22) PCT Filed: Feb. 4, 2011

(86) PCT No.: PCT/JP2011/052962
§ 371 (c)(1),
(2), (4) Date: Sep. 10, 2012

(87) PCT Pub. No.: WO2011/096592
PCT Pub. Date: Aug. 11, 2011

(65) Prior Publication Data
US 2013/0004883 A1    Jan. 3, 2013

(30) Foreign Application Priority Data
Feb. 4, 2010   (JP) ................. 2010-023208

(51) Int. Cl.
*C22C 38/44*    (2006.01)
*C23C 8/26*    (2006.01)
(Continued)

(52) U.S. Cl.
CPC .............. *C23C 8/26* (2013.01); *B21C 37/154* (2013.01); *C21D 1/06* (2013.01); *C21D 1/74* (2013.01);
(Continued)

(58) Field of Classification Search
CPC .............. B22F 2207/00; B22F 2207/01; B22F 2207/07; B22F 2201/02; B22F 5/106;
(Continued)

(56) References Cited

U.S. PATENT DOCUMENTS 3,943,010 A * 3/1976 Hartline, III ............. C21D 6/00
148/317
4,162,758 A   7/1979 Mikarai
(Continued)

FOREIGN PATENT DOCUMENTS

JP   55-058354 A   5/1980
JP   59-047080 A   3/1984
(Continued)

OTHER PUBLICATIONS

R. E. Schramm and R. P. Reed, "Stacking Fault Energies of Seven Commercial Austenitic Stainless Steels," Metallurgical Transactions A, vol. 6A, Jul. 1975, pp. 1345-1351.*
(Continued)

*Primary Examiner* — Vanessa T. Luk
(74) *Attorney, Agent, or Firm* — Manabu Kanesaka

(57) ABSTRACT

Nitrogen (N) absorption and diffusion treatments are performed for the inner and/or outer surfaces of austenite stainless steel pipe materials in N gas atmosphere at temperatures near 1,100° C. to obtain nitrided stainless steel pipe materials having 0.25~1.7% (mass) of solid solution nitrogen (N) including a gradient structure formed within the pipe wall in which the concentration of solid solution N continuously decreases gradually from the surface. The solid solution N present in the gradient structure promotes short range ordering (SRO) of substitutional alloying elements leading to homogenization of distribution of alloying elements in the austenite phase, generating an extremely high proof strength (yield strength) about 3 times as high as that (Continued)

of conventional austenite stainless steel pipe materials and enhancing characteristic of anti-hydrogen gas embrittlement (anti-HGE) so as to be suitable for use in a high pressure hydrogen tank utilized in hydrogen cell vehicle (FCV) and a liquid hydrogen tank.

8 Claims, 2 Drawing Sheets

(51) Int. Cl.

| | | |
|---|---|---|
| C21D 6/00 | (2006.01) | |
| C21D 9/08 | (2006.01) | |
| C23C 8/80 | (2006.01) | |
| B21C 37/15 | (2006.01) | |
| C23C 8/62 | (2006.01) | |
| H01M 8/04082 | (2016.01) | |
| C21D 1/74 | (2006.01) | |
| F16L 9/02 | (2006.01) | |
| C21D 1/06 | (2006.01) | |
| C21D 1/773 | (2006.01) | |

(52) U.S. Cl.
CPC ............ *C21D 1/773* (2013.01); *C21D 6/004* (2013.01); *C21D 9/08* (2013.01); *C21D 9/085* (2013.01); *C22C 38/44* (2013.01); *C23C 8/62* (2013.01); *C23C 8/80* (2013.01); *F16L 9/02* (2013.01); *H01M 8/04201* (2013.01); *C21D 2211/001* (2013.01); *Y02P 70/56* (2015.11)

(58) Field of Classification Search
CPC ....... B22F 2201/016; C21D 1/06; C21D 1/74; C21D 1/76; C21D 1/763; C21D 1/767; C21D 1/773; C21D 8/0257; C21D 8/0294; C21D 8/0457; C21D 8/10; C21D 8/105; C21D 8/1255; C21D 9/08; C21D 9/085; C21D 9/12; C21D 9/14; C21D 2211/001; C21D 2221/10; C21D 2251/00; C21D 2251/02; C21D 2251/04; C21D 1/08; C21D 1/09; C21D 1/10; C21D 8/0478; C21D 8/0494; C21D 8/1294; C21D 9/10; C21D 2221/02; C23C 8/24; C23C 8/26; C23C 8/48; C23C 8/50; C23C 8/54; C23C 8/56; C23C 8/74; C23C 8/76; C23C 14/586; C22C 38/001
USPC ................ 148/206–287, 516–537, 316–319, 148/320–337, 909; 420/128
See application file for complete search history.

(56) References Cited

U.S. PATENT DOCUMENTS

| | | | |
|---|---|---|---|
| 4,382,829 A | 5/1983 | Kanero et al. | |
| 4,458,724 A * | 7/1984 | Kubo | C23C 8/00 138/145 |
| 4,542,846 A * | 9/1985 | Matsui | B23K 20/129 228/114.5 |
| 5,683,521 A | 11/1997 | Matsumoto et al. | |
| 7,556,700 B2 * | 7/2009 | Boisvert | A63C 1/32 148/222 |
| 2006/0191600 A1 * | 8/2006 | Omura | C21D 6/002 148/287 |
| 2007/0175547 A1 * | 8/2007 | Igarashi | C21D 8/10 148/442 |

FOREIGN PATENT DOCUMENTS

| | | |
|---|---|---|
| JP | 62-265186 A | 11/1987 |
| JP | 2001-287249 A | 10/2001 |
| JP | 2003-145225 A | 5/2003 |
| JP | 2005-161118 A | 6/2005 |
| JP | 2008-212947 A | 9/2008 |
| JP | 2008-290104 A | 12/2008 |

OTHER PUBLICATIONS

V. G. Gavriljuk, B. D. Shanina, H. Berns, "On the correlation between electron structure and short range atomic order in iron-based alloys," Acta Materialia, 48, 2000, pp. 3879-3893.*
"Glossary of Metallurgical and Metalworking Terms," Metals Handbook, ASM International, 2002, term(s): proof stress, yield strength.*
R. E. Napolitano, "Measurement of ASTM Grain Size Number," ASTM E112, date unknown, 6 pages total.*
Takeshi Nakamura, Assetsu to Rosetsu, 1$^{st}$ edition, The Nikkan Kogyo Shinbun, Ltd., Feb. 29, 1964, pp. 282 to 284, 301 to 302.

* cited by examiner

Distance from center of cross-section of pipe wall to surfase D (mm)

HIGH-NITROGEN STAINLESS-STEEL PIPE WITH HIGH STRENGTH HIGH DUCTILITY, AND EXCELLENT CORROSION AND HEAT RESISTANCE

RELATED APPLICATIONS

The present application is National Phase of International Application No. PCT/JP2011/052962 filed Feb. 4, 2011, and claims priority from Japanese Application No. 2010-023208, filed Feb. 4, 2010.

ART FIELD

The present invention relates generally to a stainless steel pipe, and more particularly to a high-nitrogen stainless steel pipe and hollow materials of various shapes and sizes, which are formed from the steel pipe, with a high strength and ductility, and an excellent corrosion and heat resistance, and process for producing same.

BACKGROUND OF THE INVENTION

An austenite stainless steel with excellent corrosion and heat resistance is utilized as important pipe arrangement materials in a wide range of industrial field such as steam-power generation, atomic power generation, automotive engineering, petrochemistry and, chemical engineering.

Recently, austenite stainless steel pipes with high nickel content are being noted especially as compressed hydrogen gas storage tank materials to be employed in a fuel cell vehicle (FCV) that is regarded as the most likely candidate car, among eco-friendly cars, immediately following an electric vehicle (EV) which has already been put to practical use.

The reason why austenite stainless steel pipes with high nickel concentration are noted as the aforementioned tank materials is due to enduring hydrogen gas embrittlement (HGE) under compressed hydrogen gas environment, while most metal pipe materials tend to cause HGE in such hydrogen gas environment.

However, application of conventional austenite stainless steels having high nickel concentration such as SUS316L and SUS310S to the compressed hydrogen gas storage tank material will be impossible, because of their low strength.

Therefore, such high nickel austenite stainless steel pipes have to be largely strengthened without loss of their ductility in order to employ them as the hydrogen tank.

As nitrogen (N) in an amount of, e.g., about 0.9% (by mass) is added to a chromium-nickel type stainless steel having a composition equivalent to that of SUS316L which is typical high nickel austenite stainless steel, the resulting stainless steel increases in offset yield strength (yield strength) to about three times as high as that of SUS316L stainless steel, with no decrease in fracture toughness yet with much more improvements in corrosion resistance, especially in pitting corrosion resistance.

So far, high-N austenite steels having nitrogen in an amount of up to about 0.1 to 2% (by mass) have been produced by melting-solidification processes usually in nitrogenous atmospheres.

In such melting solidification processes, however, a large amount of nitrogen gas liberates during solidification of the liquid phase due to the nitrogen solubility gap between both phases of liquid and solid, leading to formation of faults like blow holes in the solidified products. Moreover, there are difficulties that segregation generating in the solid phase cannot be avoided especially in large solid products. Accordingly, sound products without such faults are difficult to obtain by the melting-solidification processes as mentioned above.

Now, a high-nitrogen austenite stainless steel material, too, has been intensively tried to manufacture by a nitrogen-absorption and solid diffusion process (also called a solution nitriding process) wherein an austenite stainless steel is treated in nitrogen gas atmosphere in a range of temperatures as high as 1200° C. to cause nitrogen (N) to be absorbed into the surface of the steel and diffused into the solid phase.

However, since such N absorption and diffusion processing is usually performed in relatively high temperature regions of 1200° C. or above, it causes enlargement of the crystal grain in the austenite steel material, resulting in a marked loss of its ductility in contrast to a highly increase in strength thereof due to forming a high concentration solid solution of N.

In addition, it is practically difficult to effectively apply the N absorption and diffusion process to steel plate or pipe materials with a relatively large wall thickness in view of the time required in such process.

Especially, in the case where N absorption and diffusion treated pipe materials are utilized, for instance, as hollow materials like fuel gas storage tank, for fuel cell vehicles (FCVs), with relatively large dimensions, e.g. diameter and thickness, they are required to have not only their own ductility but also strength sufficient thereto; any satisfactory austenite stainless steel material is not achievable as yet.

DISCLOSURE OF THE INVENTION

The present invention has for its objection the provision of satisfactory solutions to the above problems.

Basically, the present invention makes use of nitrogen absorption and diffusion processing for an austenite stainless steel pipe material, wherein the stainless steel pipe materials are treated in nitrogen gas atmosphere in a range of temperatures near 1000 to 1100° C. not higher than the critical temperature for crystal grain enlargement of the steel material to cause nitrogen (N) to be absorbed into the surface of the steel material and diffused into the solid phase. The resulting N absorption and diffusion processed stainless steel material has a gradient structure composed of a part that is close to the steel surface part and has been highly strengthened by the formation of a high concentration solid solution of N and a part in which ductility gradually increases toward around the center of the cross-section of the steel as the N concentration decreases, and the enlargement of crystal grains is minimized during the treatment, thereby providing a nobel austenite stainless steel pipe material with high strength and ductility and excellent corrosion and heat resistance.

Furthermore, the thus-obtained stainless pipe material is strengthened by slight plastic working so as to provide a nobel stainless steel pipe material showing much better strength and ductility.

The present invention also provides a nobel process for manufacturing a N absorption and diffusion treated high-nitrogen austenite stainless steel pipe material with fine crystal grains leading to an improved elongation (ductility) as well as a high strength by applying grain refinement treatment utilizing, for instance, eutectoid transformation of the austenite phase to N absorption and diffusion treated steel material.

Furthermore, the present invention provides a nobel process for manufacturing a high-nitrogen austenite pipe or hollow materials whose manufacture is difficult to realize using a single N absorption and diffusion processed stainless steel pipe material alone, in which a plurality of N absorption and diffusion processed austenite steel pipe of the same quality are disposed one over another so as to result in dimensions, e.g., diameter and wall thickness, according to the use or strength level, and the pipe arrangement is united by adhesion processing through hot drawing, hot rolling, or other methods, thereby obtaining a high-nitrogen austenitic steel pipe or hollow material which has high strength and ductility, and excellent corrosion and heat resistance and has repetitions of the gradient structure within the austenitic steel wall.

The stainless-steel pipe or hollow material can have large or small sizes and be of various kinds, and examples thereof include a hollow material for use as container for storing high-pressure hydrogen gas which is for fuel cell vehicles (FCVs) and which does not suffer hydrogen gas embrittlement (HGE) in the presence of high-pressure hydrogen gas.

Thus, the present invention is concerned with high-nitrogen austenite stainless steel pipes and hollow materials constructed as recited below, and their manufacture processes and uses.

<1> A high nitrogen stainless steel pipe with a high strength and ductility, and an excellent corrosion and heat resistance, comprising an austenite steel containing 0.25 to 1.7% (by mass) of solid solution nitrogen including a gradient structure formed within the pipe wall in which the concentration of solid solution nitrogen continuously decreases gradually from the surface, characterized in that the outside surface and/or the inside surface of said steel pipe are in contact with a substance that becomes a nitrogen source in a range of temperatures not higher than the critical temperature for crystal grain enlargement of the steel pipe material, so that nitrogen is absorbed into the surface of the pipe and diffused into the solid phase, and formed are said austenite solid solution and said gradient structure which comprises a part that is close to the surface and has been highly strengthened by the formation of a high concentration solid solution of nitrogen and a part in which ductility gradually increases toward around the center of the cross-section of the pipe as the nitrogen concentration decreases, moreover subsequently annealing the pipe with said gradient structure in vacuum, inert gas such as argon gas or an atmosphere of a gas with some reducing substance such as $H_2$ gas added thereto in said range of temperatures leads to a gradual decreasing of the concentration gradient of nitrogen in said gradient structure, or furthermore the resultant pipe material is strengthened by plastic working such as drawing, rolling, extrusion or the like.

<2> A high nitrogen stainless steel pipe with a high strength and ductility, and an excellent corrosion and heat resistance, comprising an austenite steel containing 0.25 to 1.7% (by mass) of solid solution nitrogen including a gradient structure formed within the pipe wall in which the concentration of solid solution nitrogen continuously decreases gradually from the surface, characterized in that the outside surface and/or the inside surface of said steel pipe are in contact with a substance that becomes a nitrogen source in a range of temperatures (1) not higher than the critical temperature for crystal grain enlargement of the steel pipe material or in a range of temperatures (2) exceeding said critical temperature, so that nitrogen is absorbed into the surface of the pipe and diffused into the solid phase, and formed are said austenite solid solution and said gradient structure which comprises a part that is close to the surface and has been highly strengthened by the formation of a high concentration solid solution of nitrogen and a part in which ductility gradually increases toward around the center of the cross-section of the pipe as the nitrogen concentration decreases, moreover subsequently annealing the pipe with said gradient structure in vacuum, inert gas such as argon gas or an atmosphere of a gas with some reducing substance such as $H_2$ gas added thereto in said range of temperatures leads to a gradual decreasing of the concentration gradient of nitrogen in said gradient structure, furthermore, for thus obtained pipe material through said nitrogen absorption-diffusion and annealing processing, the following crystal grain refining (crystal grain size reducing) treatment (a) or (b) is practiced:

(a) heating leading to austenitizing said steel pipe material (procedure <i>), subsequently slow-cooling such as air cooling (procedure <ii>) leading to decomposition into a mixture of fine ferrite and nitride utilizing the eutectoid transformation of the austenite, and practicing 1 or more repetitions of a series of these procedures wherein the final cooling of procedure <ii> is rapidly continued to retain the refined austenite, or (b) plastic working (procedure <i>) said steel pipe using drawing, rolling, extrusion or the like below the recrystallization temperature of the steel pipe material, subsequently heating it to the austenite region, i.e., austenitizing (procedure <ii>), thereafter rapidly cooling said austenitized pipe material (procedure <iii>) to retain the refined austenite, and practicing 1 or more repetitions of a series of these procedures, or moreover the resulting steel pipe material is strengthened by plastic working such as drawing, rolling, extrusion or the like.

<3> A high nitrogen stainless steel pipe material with a high strength and ductility, and an excellent corrosion and heat resistance, comprising plurality (1) of said stainless steel pipe, surface-polished to generate its original surface, of any one according to said <1> to <2> above disposed one over another so as to result in dimensions, e.g., diameter and wall thickness of the pipe, depending on the use or strength level, or plurality (2) of said stainless steel pipe and other pipe, surface-polished to generate its original surface, as adhesion material disposed one over another as in the case of said plurality (1), wherein one or one or more selected from a group of said other pipe described below as (a) to (e) is sandwiched between said stainless pipe; (a) former austenite stainless steel pipe without nitrogen absorption and diffusion plus annealing treatment, (b) other high nickel austenite stainless steel pipe, (c) nickel or nickel alloy pipe, (d) aluminum or aluminum alloy pipe, and (e) other pipe as adhesion material, characterized in that the pipe arrangement shown in said plurality (1) or (2) is united by adhesion processing through hot or warm plastic working such as drawing, rolling, extrusion or the like, leading to a high nitrogen austenite pipe or hollow materials whose manufacture is difficult to realize from a single nitrogen absorption and diffusion processed stainless steel pipe material alone, or furthermore the resulting united steel pipe material is strengthened by plastic working such as drawing, rolling, extrusion or the like.

<4> The high nitrogen stainless steel pipe material with a high strength and ductility, and an excellent corrosion and heat resistance according to any one of <1> to <3> above, characterized in that said pipe material comprises a kind of steel selected from a group of (1) austenite stainless steel, (2) ferritic stainless steel, and (3) ferrite-austenite stainless steel.

<5> A process for manufacturing a high nitrogen stainless steel pipe material, characterized by involving steps of:

keeping the outside surface and/or the inside surface of an austenite stainless steel pipe material in contact with a substance that becomes a nitrogen (N) source, heating said steel pipe together with said nitrogen source substance at a temperature of 800 to 1100° C. in a range of temperatures not higher than the critical temperature for crystal grain enlargement of the steel pipe material to cause nitrogen to be absorbed into the surface of the pipe and diffused into the steel solid phase, thereby obtaining an austenite steel pipe material with high concentration of solid solution nitrogen having a gradient structure formed within the steel pipe wall that comprises a part which is close to the surface part of the pipe and has been highly strengthened by the formation of a high-concentration solid-solution of N and a part in which ductility gradually increases toward around the center of the cross-section of the pipe as the N concentration decreases, and applying to said heat-treated pipe material annealing treatment in said range of temperatures in vacuum, inert gas such as argon gas or an atmosphere of a gas with some reducing substance like $H_2$ gas added thereto, to result in a gradual decreasing of nitrogen concentration gradient, or applying to said pipe material plastic working operation such as drawing, rolling, extrusion or the like, thereby obtaining a high nitrogen stainless steel pipe material with a high strength and ductility and an excellent corrosion and heat resistance, which comprises an austenite steel containing 0.25 to 1.7% (by mass) of solid-solution nitrogen having a gradient structure in which the concentration of solid solution nitrogen continuously decreases gradually from the surface toward around the center of the cross-section of the pipe.

<6> A process for manufacturing a high N stainless steel pipe material, characterized by involving steps of:

keeping the outside surface and/or the inside surface of an austenite stainless steel pipe material in contact with a substance that becomes a nitrogen (N) source, heating said steel pipe together with said N source substance at a temperature of 800 to 1100° C. in a range of temperatures (1) not higher than the critical temperature for crystal grain enlargement of the steel pipe material, or at a temperature above 1100° C. in a range of temperatures (2) exceeding said critical temperature, to cause N to be absorbed into the surface of the pipe and diffused into the steel solid phase, thereby obtaining an austenite steel pipe material with high concentration of solid solution nitrogen having a gradient structure formed within the pipe wall that comprises a part which is close to the surface and has been highly strengthened by the formation of a high concentration solid solution of nitrogen and a part in which ductility gradually increases toward around the center of the cross-section of the pipe as the N concentration decreases, applying to said heat-treated pipe material annealing treatment in said range of temperatures not higher than said critical temperature in vacuum, inert gas such as argon gas or an atmosphere of a gas with some reducing substance like $H_2$ gas added thereto, to result in a gradual decreasing of the N concentration gradient, and applying to said annealed pipe material crystal grain refining (i.e., crystal grain size reducing) treatment by the following (a) or (b):

(a) austenitizing (heating) said steel pipe material (procedure <i>), subsequently slow-cooling such as air cooling (procedure <ii>) leading to decomposition into a mixture of fine ferrite and nitride utilizing the eutectoid transformation of the austenite, and practicing 1 or more repetitions of a series of these procedures wherein the final cooling of procedure <ii> is rapidly continued to retain the refined austenite, or (b) plastic working procedure <i> said steel pipe using drawing, rolling, extrusion or the like below the recrystallization temperature of the steel pipe material, subsequently heating it to the austenite region, i.e., austenitizing (procedure <ii>), thereafter rapidly cooling said austenitized pipe material (procedure <iii>) to retain the refined austenite, and practicing 1 or more repetitions of a series of these procedures, or applying to said pipe material plastic working operation such as drawing, rolling, extrusion or the like, thereby obtaining a high strength and ductility and an excellent corrosion and heat resistance, which comprises an austenite steel containing 0.25 to 1.7% (by mass) of solid-solution nitrogen having a gradient structure in which the concentration of solid solution nitrogen continuously decreases gradually from the surface toward around the center of the cross-section of the pipe.

<7> A process for manufacturing a high N stainless steel pipe material, characterized by involving steps of:

disposing plurality (1) of said stainless steel pipe of any one according to said <5> to <6> above one over another so as to result in dimensions, e.g., diameter and wall thickness of the pipe, according to the use or strength level or plurality (2) of said stainless steel pipe of any one according to said <5> to <6> above and other pipe as adhesion material one over another as in the case of said plurality (1) wherein one or one or more selected from a group of said other pipe described below as (a) to (e) is sandwiched between said stainless steel pipe; (a) former austenite stainless steel pipe without nitrogen absorption and diffusion plus annealing treatment, (b) other high nickel austenite stainless steel pipe, (c) nickel or nickel alloy pipe, (d) aluminum or aluminum alloy pipe, and (e) other pipe as adhesion material, applying to said plurality (1) or (2) of the pipe material adhesion processing like hot or warm plastic working such as drawing, rolling, extrusion or the like to cause to unite said plurality (1) or (2) in a range of temperatures 15 to 40% lower than the melting temperature or the melting point in Kelvin scale of the adhesion material in an oxidation-inhibition atmosphere such as in $H_2$ gas or AX gas (75 vol % $H_2$ gas+25 vol % $N_2$ gas), or furthermore applying to said united pipe material plastic working operation such as drawing, rolling, extrusion or the like, thereby obtaining a high nitrogen stainless steel pipe material with a high strength and ductility and an excellent corrosion and heat resistance, which basically comprises an austenite steel containing 0.25 to 1.7% (by mass) of solid solution nitrogen having a gradient structure in which the concentration of solid solution nitrogen continuously decreases gradually from the surface toward around the center of the cross-section of the pipe.

<8> The process for manufacturing a high nitrogen stainless steel pipe according to any one of <5> to <7> above, characterized in that in the case where $NH_3$ gas or $NH_3$ gas with some $H_2$ gas or argon gas is utilized as a substance that becomes a nitrogen source wherein the nitrogen absorption and diffusion treatment using said nitrogen source like $NH_3$ gas substantially entails annealing processing, annealing after nitrogen absorption and diffusion treatment according to any one of <5> to <7> above can be omitted.

<9>

The process for manufacturing a high nitrogen stainless steel pipe according to any one of <5> to <8> above, characterized in that in said manufacturing process said steel pipe contains: (1) 0.02 to 0.10% (by mass) of aluminum (Al) or titanium (Ti) or (2) 0.03 to 0.15% (by mass) of aluminum and titanium in all as a prohibition element of crystal grain coarsening during said heating process of N absorption and diffusion, annealing, or adhesion processing of plurality of the pipe material.

<10>

The process for manufacturing a high nitrogen stainless steel pipe according to any one of <5> to <9> above, characterized in that said substance that becomes a nitrogen source is one or two or more substances selected from the group consisting of (1) $N_2$ gas, (2) $NH_3$ gas, (3) $N_2$ gas or $NH_3$ gas with some $H_2$ gas or argon gas, (4) iron nitride, (5) chromium nitride and (6) manganese nitride.

<11>

The process for manufacturing a high nitrogen stainless steel pipe according to any one of <5> to <10> above, characterized in that one or one or more polishing treatment selected from the group consisting of (1) electrolytic polishing, (2) chemical polishing, and (3) mechanical polishing like wire brushing is applied to said outer side surface and/or said inner side surface of the pipe before said N absorption and diffusion treatment and said stainless steel pipe and said adhesion pipe material before adhesion processing of said <7> above.

<12>

The process for manufacturing a high nitrogen stainless steel pipe according to any one of <5> to <11> above, characterized in that furthermore heat treatment such as (1) annealing, (2) aging or (3) solution heat treatment is applied to said manufacturing process according to circumstances.

<13>

A product formed of the high nitrogen austenitic stainless steel pipe material according to any one of <1> to <4> above, wherein said product is a high-pressure hydrogen gas container and a liquid hydrogen container which are for fuel cell vehicles (FCVs) or the like or a stainless steal pipe or hollow material which can have large or small sizes and be of various kinds.

According to the invention, the critical temperature for crystal grain enlargement of the stainless steel pipe material during the nitrogen absorption-diffusion processing as mentioned above is judged to be a temperature between 1110 to 1120° C., i.e., a little exceeding 1100° C., from the result the mean crystal grain diameter of the pipe material processed at a temperature of 1120 to 1130° C. was rapidly increased to 200 to 300 μm while that of the pipe material processed at a temperature up to 1100° C. was near 100 μm.

According to the invention, as nitrogen absorption and diffusion processing is applied to an austenitic stainless steel pipe material, in the case where the stainless steel pipe material is treated in nitrogen gas atmosphere at a temperature of 1050 to 1100° C., in a range of temperatures not higher than the critical temperature for crystal grain enlargement of the steel material, for hr to cause nitrogen (N) to be absorbed into the surface of the steel material and diffused into the solid phase, the resulting stainless steel material has a gradient structure which comprises a part that is close to the steel surface part and has been highly strengthened by the formation of a high concentration-solid solution of N and a part in which ductility gradually increases toward around the center of the cross-section of the steel as the N concentration decreases, and the enlargement of crystal grains is minimized during the treatment. Thereafter, as the N absorption and diffusion processed stainless steel pipe material is annealed in argon gas at 1050 to 1100° C. for 24 hr, there is obtained a nobel austenite stainless steel pipe material with high strength and ductility and excellent corrosion and heat resistance that can never be achieved by conventional processes, and which is much more reinforced by slight plastic working such as drawing, rolling, extrusion or the like.

According to the invention, as grain refining processing utilizing eutectoid transformation of the austenite is applied to the austenite stainless steel pipe material having undergone nitrogen absorption-diffusion and annealing treatments, there is obtained an extremely fine crystal grain structure.

Thus, the synergistic effects of the solid solution strengthening originally coming from the gradient structure formed by nitrogen and the enhanced crystal grain refinement are combined with the ductility (elongation) inherent in the austenite phase to make it easy to manufacture a highly strong and ductile austenite stainless steel pipe material.

According to the invention, as adhesion processing such as hot drawing and hot rolling is applied to a plurality of austenite stainless steel pipes having undergone said treatments of nitrogen absorption-diffusion, annealing, and grain refining as stated above, it is formed into a united austenite stainless steel pipe or hollow material with high strength and ductility which has dimensions, e.g., diameter and wall thickness according to the use or strength level required and which has repetitions of the gradient structure, as described above, within the pipe wall, existence of such gradient structure making it easy to pertinently adjust the mechanical properties thereof.

Thus obtained united stainless steel pipe having particularly large dimensions and high strength level cannot be manufactured by using single such stainless steel pipe alone and by using conventional processes too.

According to the invention, in high nitrogen austenite stainless steel, the characteristic of anti-HGE (anti-hydrogen gas embrittlement) seen in high nickel austenite stainless steel is still more enhanced by the solid solution nitrogen present in said gradient structure, because the nitrogen especially promotes short range ordering (SRO) of substitutional alloying elements leading to homogenization of distribution of alloying elements in the austenite phase through increase in concentration of free electron providing more metallic character of interatomic bonds, such homogenization of distribution of alloying elements in austenite phase also leading to excellent pitting corrosion resistance as well as stabilization thereof.

According to the invention, as nitrogen absorption-diffusion processing is applied to an austenite stainless steel pipe material in nitrogen gas atmosphere, a gradient structure as stated above is formed within the pipe wall, and nitrogen (N) contained in the gradient structure, whose N concentration range is wide, lowers stacking fault energy (SFE) of the austenite phase in pipe material, so that the extended dislocation containing stacking fault is stabilized to higher temperature side, the softening temperature rising around 100° C.

● (sample b): 30-hr holding in $N_2$ gas at 1075° C. (N absorption and diffusion into solid phase)

Figure 2:
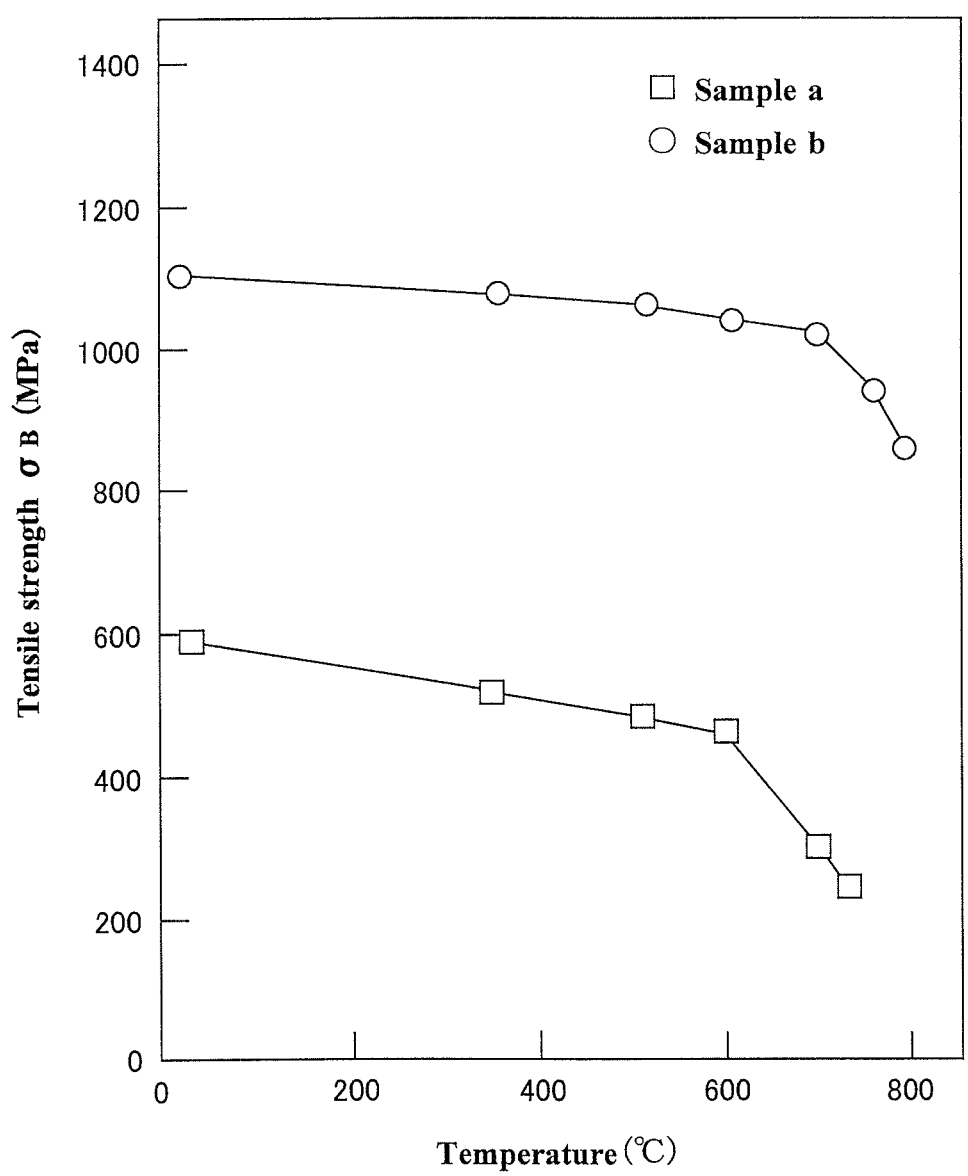

○ (sample c): 30-hr holding in $N_2$ gas at 1075° C.+24-hr holding in argon gas at 1075° C. (Annealing)
◇ (sample a): Commercial material.
FIG. 2 is illustrative of temperature dependence of tensile strength ($\sigma_B$) of austenite stainless steel pipe samples a and b of Fe-18Cr-12Ni-2.5Mo-0.06C (mass %), as used in one specific example of the invention.
○ (sample b): 30-hr holding in $N_2$ gas at 1075° C.+24-hr holding in argon gas at 1075° C.+grain refining
□ (sample a): Commercial material.

BEST MODE FOR CARRYING OUT THE INVENTION

Some embodiments of the invention are now explained. In one embodiment of the invention, nitrogen absorption and diffusion processing is applied to an austenite stainless steel pipe. In this processing, the austenite stainless steel pipe, surface-electropolished, (outside dia 26 mm, 3 mm thick) of Fe-18Cr-12Ni-2.5Mo-0.02C (mass %) is treated in nitrogen gas at a temperature of 1070 to 1100° C., which is not higher than the critical temperature for crystal grain enlargement of the steel material, for 30 hr to cause nitrogen (N) to be absorbed into the surface of the steel pipe material and diffused into the solid phase, followed by annealing in argon gas at a temperature of 1070 to 1100° C. for 24 hr.

The resulting stainless steel pipe material has a gradient structure which comprises a part that is close to the steel surface part and has been highly strengthened by the formation of a high concentration solid solution of N and a part in which ductility gradually increases toward around the center of the cross-section of the steel as the N concentration decreases, and the enlargement of crystal grain is minimized during the processing, thereby obtaining a high nitrogen austenite stainless steel pipe material with high strength and ductility.

Furthermore, if grain refining (i.e., crystal grain size reducing) treatment utilizing, for instance, eutectoid transformation of the austenite is applied to the austenite stainless steel pipe material having undergone both the nitrogen absorption-diffusion and the annealing processing, it is then possible to manufacture much more improved steel pipe material, because there is obtained an extremely fine austenite with crystal grains of the order of 10 to 30 μm leading to a marked elongation of the pipe material.

Synergistic effects of the solid solution strengthening originally coming from the gradient structure formed by nitrogen and the enhanced crystal grain refinement are combined with the ductility (elongation) inherent in the austenite phase to make it easy to manufacture a highly strong and ductile austenite stainless steel pipe material.

Moreover, the resulting steel pipe material is more strengthened by plastic working such as drawing, rolling, extrusion or the like.

It is thus possible to achieve effective manufacture of high-nitrogen-concentration austenite stainless steel pipe materials having the gradient structure as mentioned above.

In yet another embodiment of the invention, adhesion processing is applied to a plurality of austenite stainless steel pipes with the same chemical composition but different dimensions having undergone said treatments of nitrogen absorption-diffusion, annealing, and grain refining as described above using a hot drawing, hot rolling or other methods at a temperature of 1050 to 1100° C. in $H_2$ gas atmosphere.

The resultant united austenite stainless steel pipe or hollow material has dimensions, e.g., diameter and wall thickness according to the use or strength level required and has repetitions of the gradient structure, as mentioned above, within the pipe wall, existence of such gradient structures in the united stainless steel material, making it easy to adjust pertinently the mechanical properties thereof.

It is also thus possible to achieve more effective manufacture of the united austenite stainless steel pipe or hollow material with particularly large dimensions and high strength level that cannot be manufactured by using single stainless steel pipe material alone.

EXAMPLES

Examples of the invention are now explained with reference to the accompanying drawings.

Example 1

Set out in Table 1 are the mean crystal grain diameter D, offset yield strength $\sigma_{0.2}$, tensile strength $\sigma_B$, and elongation δ of stainless steel pipe samples (26 mm outside dia×150 mm long×3 mm thick) of (a) Fe-18Cr-12Ni-2.5Mo-0.02C (mass %) and (b) Fe-20Cr-8Ni-0.03C (mass %) obtained by applying nitrogen (N) absorption and solid diffusion treatment to their surface-electropolished samples in 0.1 MPa $N_2$ gas at both the temperatures of 1075° C. and 1200° C. for 30 hr, followed by annealing in argon gas at the same temperatures as those of N absorption and diffusion treatment for 24 hr.

TABLE 1

Mean crysral grain diameter D, offset yield strength $\sigma_{0.2}$, tensile strength $\sigma_B$, and elongation δ of stainless steal pipe samples (26 mm outside dia × 150 mm long × 3 mm thick) of (a) Fe—18Cr—12Ni—2.5Mo—0.02C (mass %) and (b) Fe—20Cr—8Ni—0.03C (mass %) obtained by applying nitrogen (N) absorption and solid diffusion treatment to their surface-electropolished samples in 0.1 MPa $N_2$ gas at both the temperatures of 1075° C. and 1200° C. for 30 hr, followed by annealing in argon gas at the same temperatures as those of N absorption and diffusion treatment for 24.

| Temperature ° C. | D μm | $\sigma_{0.2}$ MPa | $\sigma_B$ MPa | δ % |
|---|---|---|---|---|
| | | a | | |
| 1075 | 115 | 510 | 850 | 50.0 |
| 1200 | 562 | 593 | 872 | 5.7 |
| (Commercial material) | 100 | 265 | 549 | 68.0 |
| | | b | | |
| 1075 | 107 | 525 | 890 | 45.0 |
| 1200 | 493 | 624 | 908 | 4.6 |
| (Commercial material) | 95 | 285 | 598 | 66.4 |

Value of D: microscopically determined.
Test pieces: as cut from tublar material/gauge length 50 mm/gripped ends inserted with metal plugs.

From a comparison of the results obtained at 1075° C. of both the sample (a) and the sample (b) with those obtained at 1200° C., it has been found that according to the invention although the values of offset yield strength $\sigma_{0.2}$ and tensile strength $\sigma_B$ of the samples processed at 1075° C. and 1200° C. are remarkably increased, the values of elongation δ of these samples processed at 1200° C. are extremely decreased.

Example 2

Set out in Table 2 are the mean crystal grain diameter D, offset yield strength $\sigma_{0.2}$, tensile strength $\sigma_B$, and elongation δ of stainless steel pipe sample (26 mm outside dia×150 mm long×3 mm thick) of Fe-18Cr-12Ni-2.5Mo-0.02C (mass %) obtained by applying nitrogen absorption and solid diffusion treatment to the surface-electropolished sample in 0.1 MPa NH$_3$ gas at a temperature of 520° C. for 60 h, followed by annealing in argon gas at a temperature of 1075° C. for 24 h.

TABLE 2

Mean crystal grain diameter D, offset yield strength $\sigma_{0.2}$, tensile strength $\sigma_B$, and elongation δ of stainless steel pipe sample (26 mm outside dia × 150 mm long × 3 mm thick) of Fe—18Cr—12Ni—2.5Mo—0.02C (mass %) obtained by applying nitrogen absorption and solid diffusion treatment to the surface-electropolished sample in 0.1 MPa NH$_3$ gas at a temperature of 520° C. for 60 h, followed by annealing in argon gas at a temperature of 1075° C. for 24 h.

| | D μm | $\sigma_{0.2}$ MPa | $\sigma_B$ MPa | δ % |
|---|---|---|---|---|
| N absorption · solid diffusion: 520° C. × 60 hr in NH$_3$ gas annealing: 1075° C. × 24 hr in argon gas | 107 | 520 | 865 | 40.3 |
| (Commercial material) | 100 | 265 | 549 | 68.0 |

Value of D: microscopically determined.
Test pieces: as cut from tublar material/gauge length 50 mm/gripped ends inserted with metal plugs.

Example 3

The stainless steel pipe sample surface-electropolished (26 mm outside dia×150 mm long×3 mm thick) of Fe-18Cr-12Ni-2.5Mo-0.02C (mass %), was processed by 30-hr holding in N$_2$ gas at 1075° C. [N absorption-Diffusion] (sample a), followed by 24-hr annealing in argon gas [Annealing] (sample b) and 20%* cold drawing [Drawing] (sample d)

*$[(D_0-D_x)/D_0]\times100=20(\%)$ where $D_0$ and $D_x$ are outside diameter of pipe before and after cold drawing, respectively.

The offset yield strength $\sigma_{0.2}$, tensile strength $\sigma_B$, elongation δ, and mean crystal grain diameter D microscopically determined are shown in table 3.

TABLE 3

The offset yield strength $\sigma_{0.2}$, tensile strength $\sigma_B$, elongation δ, and mean crystal grain diameter D of said sample a, sample b, and sample d described in Example 3 of Fe—18Cr—12Ni—2.5Mo—0.02C (mass %) pipe material.

| | a | b | c | d |
|---|---|---|---|---|
| $\sigma_{0.2}$ MPa | 502 | 510 | 265 | 769 |
| $\sigma_B$ MPa | 685 | 850 | 549 | 1016 |
| δ % | 28.3 | 50.0 | 68.0 | 42.0 | c: commercial material
test pieces: as cut from tublar material/gauge length 50 mm/gripped ends inserted with metal plugs.

Example 4

Figure 1:
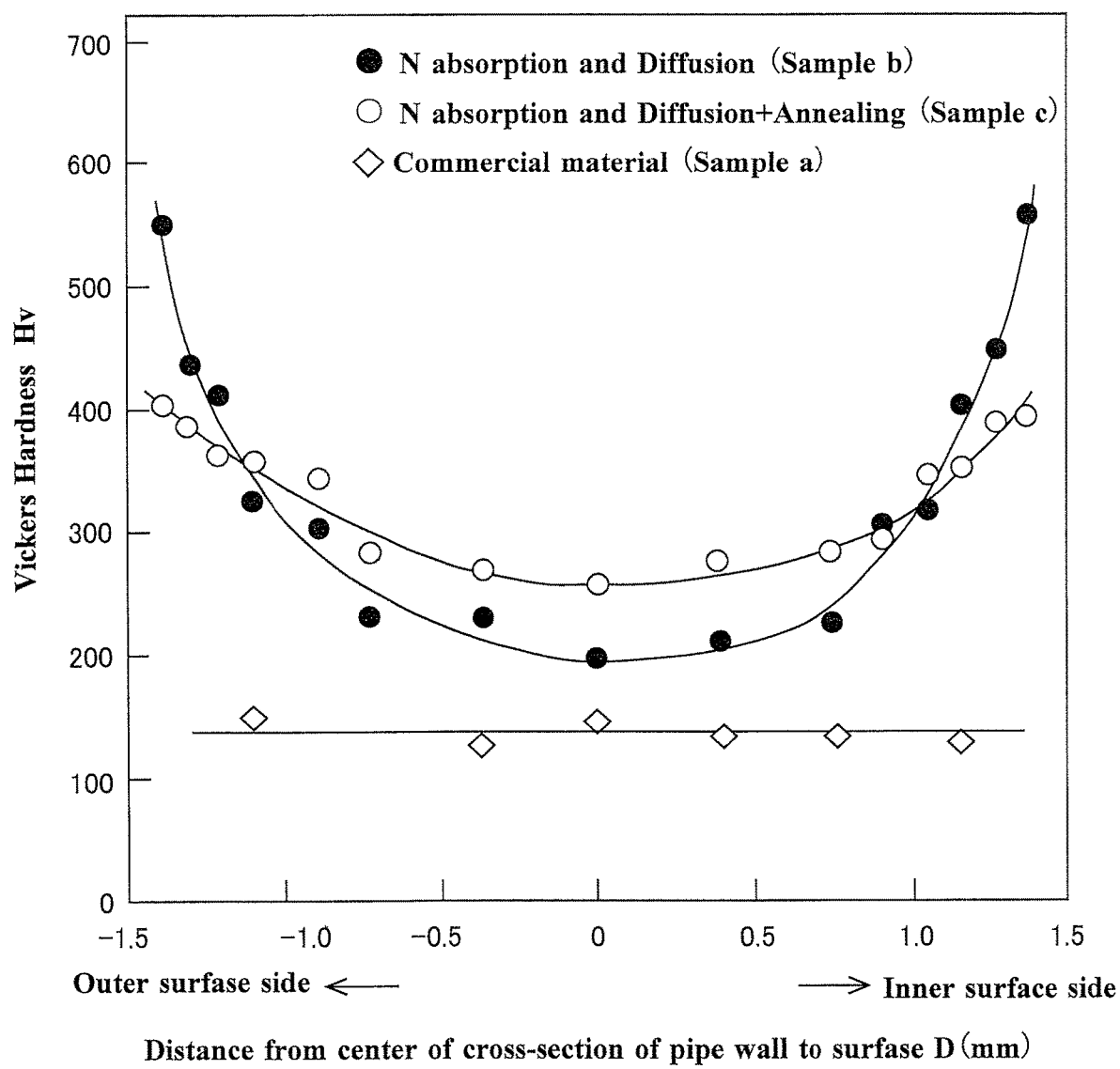
FIG. 1 is illustrative of Vickers hardness (Hv) of cross-section of austenite stainless steel pipe of Fe-18Cr-12Ni-2.5Mo-0.02C (mass %) having undergone the treatments, as used in one specific example of the invention.

FIG. 1 is illustrative of Vickers hardness (Hv) of cross-section of austenite stainless pipe (outside dia 26 mm×150 mm long×3 mm thick) of Fe-18Cr-12Ni-2.5Mo-0.02C (mass %) having undergone the treatments.
● (sample b): 30-hr holding in N$_2$ gas at 1075° C. (N absorption and diffusion into solid phase)
○ (sample c): 30-hr holding in N$_2$ gas at 1075° C.+24-hr holding in argon gas at 1075° C. (Annealing)
◇ (sample a): Commercial material.

Hv value/N (mass %) of the surface part of sample (b) and (c) were about 550/0.9 and 400/0.7, respectively.

From FIG. 1, it has been seen that although Vickers hardness Hv of the surface part of the N absorption processed sample (b) is markedly increased due to the formation of solid solution of N compared to the center part remaining a little increase in Hv, in annealing processed sample (c), diffusion of N is promoted so that there appeared a considerable N solid solution hardening even in the center part, the gradient of Hv vs D curve becoming gentle.

It has been here noted that within the pipe wall in the sample, e.g. C, is formed a gradient structure which comprise a part that is close to the surface part of the pipe and has been highly strengthened by the formation of a high-concentration solid solution of N and a part in which ductility gradually increases toward around the center of the cross-section of the pipe as the N concentration decreases.

Example 5

The stainless steel pipe sample surface-electropolished (outside dia 26 mm×150 mm long×3 mm thick) of Fe-18Cr-12Ni-2.5Mo-0.02C (mass %) was processed by 30-hr holding in N$_2$ gas at 1075° C. [N absorption and Diffusion] and 24-hr annealing in argon gas at 1075° C. [Annealing] (sample a) followed by crystal grain refining (1) (sample b) and crystal grain refining (2) (sample c) described below.

The offset yield strength $\sigma_{0.2}$, tensile strength $\sigma_B$, elongation δ, and mean crystal grain diameter D are shown in Table 4. The values of D were microscopically determined.

TABLE 4

Mean crystal grain diameter D, offset yield strength $\sigma_{0.2}$, tensile strength $\sigma_B$, and elongation δ of said samples a, b, and c described in explanation of Example 5 of Fe—18Cr—12Ni—2.5Mo—0.02C (mass %) pipe material.

| Sample | D μm | $\sigma_{0.2}$ MPa | $\sigma_B$ MPa | δ % |
|---|---|---|---|---|
| a | 115 | 510 | 850 | 50.0 |
| b | 30 | 716 | 1004 | 65.0 |
| c | 34 | 692 | 973 | 59.7 |

Test pieces: as cut from tublar material/gauge length 50 mm/gripped ends inserted with metal plugs.

Crystal Grain Refining (Treatment) (1)

N absorption—Diffusion and Annealing processed said sample (a) was grain refined by the following processes [1] to [7]:

[1] heating to 1200° C. (austenitizing)
[2] 5 to 6-minutes holding at 1200° C.
[3] air cooling (decomposition of austenite (γ) into fine ferrite (α) and nitride (Cr$_2$N))
[4] reheating to 1200° C. (formation fine of austenite (γ))
[5] 3 to 4-minutes holding at 1200° C.
[6] rapid cooling (water quenching) to room temperature
[7] fine austenite sample (b)

More fine austenite sample (b) is obtained by making use of 2 repetitions of a series of the above procedures [1] to [7]
i.e., crystal grain refining treatment (1) is based on the eutectoid transformation of austenite as shown in the following equation

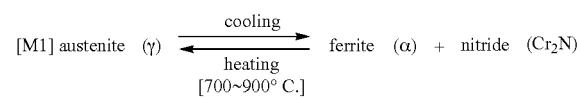

[M1] austenite (γ) $\underset{\text{heating}}{\overset{\text{cooling}}{\rightleftarrows}}$ ferrite (α) + nitride (Cr$_2$N)
[700~900° C.]

Crystal Grain Refining (Treatment) (2)

N absorption-Diffusion and Annealing processed said sample (a) was grain-refined by the following procedures [1] to [4]:

[1] 50% drawing* near 200 to 250° C., i.e., below recrystallization temperature, (work hardening)

[2] heating to 1200° C. (formation of fine austenite) and 3 to 4-minutes holding at the same temperature

[3] rapid cooling (water cooling)

[4] fine austenite sample (c)

*$[(D_0-D_x)/D_0] \times 100 = 50(\%)$ where $D_0$ and $D_x$ are outside diameter of pipe before and after drawing, respectively.

The stainless steel pipe sample surface-electropolished (26 mm outside dia×150 mm long×3 mm thick) of Fe-18Cr-12Ni-2.5Mo-0.02C (mass %) was processed by 30-hr holding in $N_2$ gas at 1130° C., which is in a range of temperatures exceeding the critical temperature for crystal grain enlargement, and 24-hr annealing in argon gas at said temperature (sample a), followed by grain refining utilizing the grain refining treatment (1) stated in the example 5 (sample b).

The crystal grain diameter D microscopically determined, offset yield strength $\sigma_{0.2}$, tensile strength $\sigma_B$, and elongation δ are shown in Table 5.

TABLE 5

Mean crystal grain diameter D, offset yield strength $\sigma_{0.2}$, tensile strength $\sigma_B$, and elongation δ of said samples a and b described in the present Example 6 of Fe—18Cr—12Ni—2.5Mo—0.02C (mass %) pipe material.

| sample | D μm | $\sigma_{0.2}$ MPa | $\sigma_B$ MPa | δ % |
| --- | --- | --- | --- | --- |
| a | 250 | 569 | 860 | 15.0 |
| b | 65 | 755 | 942 | 45.5 |

Test pieces: as cut from tublar material/gauge length 50 mm/gripped ends inserted with metal plugs.

Example 7

The ferritic stainless steel pipe samples surface-electropolished (outside dia 26 mm×20 mm long×4.0 mm thick) of (a) Fe-18.0Cr-0.07C (mass %) pipe and (b) Fe-18.0Cr-0.06C-0.07Al (mass %) pipe whose outer surface was shielded from ambient atmosphere by welding both edges of the pipe covered with 0.2 mm thick nickel pipe, were processed by 30-hr holding in 0.65 MPa $N_2$ gas at 1075° C., followed by cooling in 0.65 MPa $N_2$ gas and 24-hr annealing in 0.1 MPa argon gas.

The mean crystal grain diameter D and the resulting structure of the outer surface part and the inner surface part are described in Table 6.

TABLE 6

Mean crystal grain diameter D and structure of outer surface part and inner surface part of ferritic stainless steel pipe samples of the dimension of outside diameter 26 mm, length 20 mm, and thickness 4.0 mm of said pipe (a) Fe—18.0Cr—0.07C (mass %) and (b) Fe—18.0Cr—0.06C—0.07Al (mass %) processed by 30-hr holding in 0.65 MPa $N_2$ gas at 1075° C., followed by cooling in 0.65 MPa $N_2$ gas and 24-hr annealing in 0.1 MPa argon gas at 1075° C.

| sample | Al mass % | D μm inner surface part* <structure> | Outer surface part* <structure> |
| --- | --- | --- | --- |
| a | 0.001 | 453 <austenite> | 550 <austenite> |
| b | 0.070 | 112 <austenite> | 133 <ferrite> |

*Distance from surface: 0.20 mm

The mean crystal grain diameter of the patent samples of (a) and (b) without the treatment of N absorption-diffusion and Annealing were 100 μm and 90 μm, respectively.

Example 8

FIG. 2 is illustrative of temperature dependence of tensile strength ($\sigma_B$) of austenite stainless steel pipe samples (outside dia 26 mm×150 mm long×3 mm thick) (a) and (b) of Fe-18Cr-12Ni-2.5Mo-0.06C (mass %).

○ (sample b): 30-hr holding in $N_2$ gas at 1075° C.+24-hr holding in argon gas at 1075° C.+grain refining □ (sample a): Commercial material.

From Example 8, FIG. 2, it has been found that the tensile strength $\sigma_B$ of the N absorption-diffusion and grain refining processed sample (b) is strikingly increased to compared to that of sample (a) in a wide range of temperature due to the synergistic effects of N solid solution strengthening and reduction of crystal grain.

It has also been found that according to the invention in the sample (b), nitrogen (N) contained in the gradient structure, whose N concentration range is wide, decreases stacking fault energy (SFE) of the austenite phase thereof, so that the extended dislocation containing stacking fault (SF) is stabilized to higher temperature side and the softening temperature rises about 100° C.

Example 9

The austenite stainless steel pipe samples surface electropolished (22 mm outside dia×130 mm long×3 mm thick) of
(a) Fe-18Cr-12Ni-2.5Mo-0.02C (mass %) (SUS316L), (b) Fe-20Cr-8Ni-0.03C (mass %) (SUS304L), and (c) Fe-25Cr-20Ni-0.06C (mass %) (SUS310S) were processed by 30-hr holding in $N_2$ gas at 1075° C. [N absorption and Diffusion], followed by 24-hr annealing in argon gas at 1075° C. [Annealing], then grain refining using grain refining treatment (1) described in the example 5, and finally 20%* drawing

*$[(D_0-D_x)/D_0] \times 100 = 20(\%)$ where $D_0$=outside diameter of pipe before drawing
$D_x$=outside diameter of pipe after drawing The offset yield strength $\sigma_{0.2}$, tensile strength $\sigma_e$, and elongation δ of the samples (a), (b), and (c) are shown in Table 7. Here the samples (A), (B), and (C) are the parent materials (commercial materials) of the samples (a), (b), and (c), respectively.

TABLE 7

Offset yield strength $\sigma_{0.2}$, tensile strength $\sigma_B$, and elongation δ of said samples (a) and (A) of Fe—18Cr—12Ni—2.5Mo—0.02C (mass %), said samples (b) and (B) of Fe—20Cr—8Ni—0.03C (mass %), and said samples (c) and (C) of Fe—25Cr—20Ni—0.06C (mass %) described in explanation of Example 9.

| sample | $\sigma_{0.2}$ MPa | $\sigma_B$ MPa | δ % |
|---|---|---|---|
| a | 794 | 1150 | 50.0 |
| A | 265 | 549 | 68.0 |
| b | 850 | 1206 | 46.2 |
| B | 285 | 598 | 66.4 |
| c | 948 | 1300 | 37.0 |
| C | 312 | 656 | 43.0 |

Test pieces: as cut from tublar material/gauge length 50 mm/gripped ends inserted with metal plugs.

From Example 9, Table 7, it has been noted that according to the invention, the values of offset yield strength $\delta_{0.2}$ and tensile strength $\delta_B$ of the austenite stainless steel pipe samples, having undergone the treatments of absorption-diffusion, annealing, grain refining, and slight plastic working as mentioned in said explanation, are around 3 times and 2 times as high as those of commercial materials, respectively, in addition to the values of elongation δ compared favorably with those of commercial ones.

Example 10

Inner surface of pipe (sample (a), outer surface of pipe (sample (b)), and both surface of pipe (sample (c)) of stainless steel of Fe-18Cr-12Ni-3.5Mo-0.02C (mass %) were processed by 30-hr holding in $N_2$ gas atmosphere at 1075° C., followed by 24-hr annealing in argon gas atmosphere at 1075° C., then crystal grain refining using grain refining treatment (2) described in Example 5, and finally 20%* cold drawing as shown in Example 9. Here atmosphere of outer surface side of sample (a) and inner surface side (i.e. in pipe) of example (b) were filled with argon gas.

The offset yield strength $\sigma_{0.2}$, tensile strength $\sigma_B$, and elongation δ are shown in Table 8.

TABLE 8

Offset yield strength $\sigma_{0.2}$, tensile strength $\sigma_B$, and elongation δ of said sample a, b, and, c described in explanation of Example 10.

| sample | $\sigma_{0.2}$ MPa | $\sigma_B$ MPa | δ % |
|---|---|---|---|
| a | 669 | 1004 | 49.0 |
| b | 690 | 1020 | 48.0 |
| c | 775 | 1095 | 46.3 |

Test pieces: as cut from tublar material/gauge length 50 mm/gripped ends inserted with metal plugs.

Example 11

Set out in Table 9 are the offset yield strength $\sigma_{0.2}$, tensile strength $\sigma_B$, and elongation δ of the stainless steel pipe sample (α), (α$^{ND}$), (β) and (θ) manufactured from a plurality of nitrogen absorption-diffusion and annealing treated stainless steel pipes (Fe-18Cr-12Ni-3.5Mo-0.02C, mass %) using the following process (as stated in <7> above).

The processes of manufacture of said samples (α), (α$^{ND}$), (β) and (θ) are as follows.

Sample (α):

pipe sample A ($37^{OD} \times 250^L \times 3t$, mm, i.e., 37 mm in outside dia by 250 mm long by 3 mm thick), pipe sample B ($47^{OD} \times 250^L \times 3^t$, mm), and pipe sample C ($57^{OD} \times 250^L \times 3^t$, mm) were treated by 30-hr holding in $N_2$ gas at 1075° C. and 24-hr annealing in argon gas at 1075° C., followed by practicing 2 repetitions of grain-refining treatment (1) described in Example 5 and disposing a plurality of said A, B, and C one over another, then adhesion-processing through 15% hot drawing in $H_2$ gas at 1075° C. to unite said plurality of the pipe A, B, and C, and finally 20% cold drawing to result in higher strength level.

[M2] The manufacturing process is summarized as follows.

Manufacturing process:

N Absorption-Diffusion→ →

Annealing→ Grain refining→ →

$\left\{\begin{array}{l}\text{Disposing one over another}-\\ \text{Adhesion processing}\\ \text{(Hot drawing)}\end{array}\right\}$ Cold drawing ... pipe sample (α) →

$\left\{\begin{array}{l}\text{Without cold}\\ \text{drawing}\end{array}\right\}$ ... pipe sample (α$^{ND}$)

Sample (β):

Pipe sample A ($37^{OD} \times 250^L \times 3^t$, mm), whose inner surface was shielded from ambient atmosphere by welding both edges of the pipe covered with 0.2 mm thick Ni pipe, pipe sample B ($47^{OD} \times 250^L \times 3^t$, mm), and pipe sample C ($57^{OD} \times 250^L \times 3^t$, mm), surface-electropolished were treated by 30-hr holding in $N_2$ gas at 1075° C. and 24-hr annealing in argon gas at 1075° C., followed by disposing a plurality of said samples A, B, and C one over another, then adhesion-processing through 15% hot drawing in $H_2$ gas at 1075° C. to unite the plurality of said pipes A, B, and C, and finally 20% cold drawing to result in higher strength level.

[M3]

Manufacturing Process:

N Absorption-Diffusion $\left(\begin{array}{l}\text{all the surfaces of samples } A, B, \text{ and } C,\\ \text{except for inner surface of sample } A)\end{array}\right)$ → →

Annealing→ $\left\{\begin{array}{l}\text{Disposing one over another}-\\ \text{Adhesion processing}\\ \text{(Hot drawing)}\end{array}\right\}$ → →

Cold drawing ... pipe sample (β)

Sample (θ):

Each of 2 austenite stainless steel pipes, surfaced-polished, with 0.7 mm thickness as adhesion materials (having the name quality with SUS316L stainless steel pipe) without N absorption-Diffusion and Annealing treatment was sandwiched between pipe samples A and B, and between pipe samples B and C, respectively.

Thus obtained adhesion material-sandwiched steel pipe were treated as in the case of the sample (a)

[M4]
Manufacturing Process:

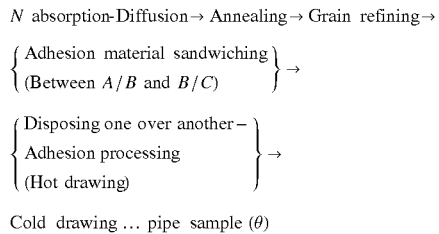

Cold drawing ... pipe sample ($\theta$)

TABLE 9

Offset yield strength $\sigma_{0.2}$, tensile strength $\sigma_B$, and elongation $\delta$ of said sample $\alpha$, $\alpha^{ND}$ $\beta$, and $\theta$ described in the present Example 11 of Fe—18Cr—12Ni—3.5Mo—0.02C (mass %) pipe material

| sample | $\alpha$ | $\alpha^{ND}$ | $\beta$ | $\theta$ |
|---|---|---|---|---|
| $\sigma_{0.2}$ MPa | 787 | 720 | 725 | 760 |
| $\sigma_B$ MPa | 1110 | 995 | 945 | 1077 |
| $\delta$ % | 52.4 | 62.0 | 43.0 | 55.0 |

Test pieces: as cut from tublar material/gauge length 50 mm/gripped ends inserted with metal plugs.

From Example 11, Table 9, it has been found that according to the invention, the values of offset yield strength $\sigma_{0.2}$ of each of the samples $\alpha$, $\alpha^{ND}$, $\beta$, and $\theta$, which are basically formed from N absorption-diffusion and annealing processed steel pipe materials, of Fe-18Cr-12Ni-3.5Mo-0.02C (mass %) are about 3 times as high as that of the commercial pipe material in addition to the values of elongation of these samples compared favorably with that of the commercial one.

Furthermore, it has been noted that the elongation of the sample $\alpha^{ND}$ without final cold drawing processing is as good as the commercial pipe material in spite of the high strength similar to those of other samples $\alpha$, $\beta$ and $\theta$.

Mechanics of materials teaches that when fluid like gas of pressure (P) is filled in cylindrical vessel with the inside dia (D) and the wall thickness (t), the maximum stress acting along the circumference direction ((e) so as to tear up the vessel is given by the following equation, in the case where the value of t is within 10% lower than that of D.

$$\sigma_\theta = (PD)/2t \qquad [M5].$$

According to eq [M5], since the parameters P, D, and t are kept in equilibrium with one another, when the values of P and D are constant, the value of thickness of the cylindrical vessel t decreases in inverse proportion to the value of $\sigma_e$, i.e., the strength level of the vessel itself; the required thickness t of the vessel decreases to around ⅓ compared to that of the vessel manufactured from conventional pipe material.

POSSIBLE APPLICATIONS OF THE INVENTION TO THE INDUSTRY

The high-nitrogen austenite stainless steel pipe and hollow materials formed therefrom obtained herein are now explained with reference to what purposes they are used for.

High-Nitrogen Austenite Stainless Steel Pipe

High-nitrogen austenite steel pipe materials have common properties as stated below. They have high strength and ductility, and show excellent pitting corrosion resistance, crevice corrosion resistance and non-magnetism as well. Furthermore, they do not undergo sharp softening from the temperature of near 200 to 300° C. on temperature rises, which is usually experienced with steel materials of the martensite or ferrite type, and they are less susceptible to low-temperature brittleness at a temperature at or lower than room temperature.

Another important feature of noteworthiness is that one exemplary high-nitrogen austenite stainless steel pipe material of SUS 316L type of the invention which has undergone the nitrogen (N) absorption-diffusion and the grain refining processing has an offset yield strength about three times as high as that of the SUS 316L stainless steel pipe material, in addition to the value of elongation compared favorably with those of commercial materials.

According to the invention as the N absorption-diffusion processing is applied to austenite stainless steel pipe material, there is obtained a gradient structure whose N concentration range is wide. The N contained in the gradient structure decreases stacking fault energy (SFE) of the austenite phase in the pipe, so that the extended dislocation containing stacking fault is stabilized to enhance the strength level as well as heat resistance thereof.

Furthermore, as adhesion processing is applied to a plurality of austenite stainless steel pipes which have undergone the N absorption-diffusion and the grain refining processing, a united austenite stainless steel pipe with dimensions according to the use or strength level required can easily be produced, which cannot be realized to produce by using single such austenite pipe alone.

In addition, in high nitrogen austenite stainless steel of the invention, characteristic of anti-HGE (anti-hydrogen gas embrittlement) that can be seen in high nickel austenite stainless steel such as SUS 316L or SUS 310S austenite stainless steel unlike many other metallic materials is still more enhanced by the solid solution nitrogen, contained in said gradient structure, that promotes short range ordering (SRO) leading to homogenization of distribution of alloying elements in the austenite phase through increase in concentration of free electron providing more metallic character of interatomic bonds.

Thus, the high-nitrogen austenite stainless steel pipe materials of the invention, because of having such features as mentioned above, can suitably find a wide spectrum of applications inclusive of high strength and ductility materials as follows:

Compressed hydrogen gas storage tank materials for fuel cell vehicle (FCV), Pipe arrangement materials for steam power generation, petrochemistry etc. and Sea related machinery and tools materials.

What is claimed is:

1. A high nitrogen stainless steel pipe material with ductility, and a corrosion and heat resistance, comprising:
an austenite steel having a chemical composition comprising Cr, Ni, Mo, C, and Fe, containing 0.25 to 1.7% (by mass) of solid solution nitrogen including a nitrogen concentration gradient structure throughout, and including an outside surface and/or an inside surface of a pipe in which a concentration of solid solution nitrogen continuously decreases gradually from the outside and/or inside surface,
wherein said austenite steel including said gradient structure comprises a part that is the outside and/or inside surface and has a high concentration solid solution of nitrogen and a part in which ductility gradually increases toward around a center of a cross-section of the pipe as the nitrogen concentration decreases, and an extended dislocation generated in an austenite phase by the solid solution nitrogen present in said gradient structure is stabilized to enhance yield strength level of the austenite phase and ductility thereof so that the solid solution nitrogen contained in said gradient structure also still more enhances characteristic of anti-hydrogen gas embrittlement, that can be seen in high nickel austenite stainless steel, as a strong austenite stabilizer element of nitrogen itself.

2. The high nitrogen stainless steel pipe material with ductility, and a corrosion and heat resistance according to claim 1, wherein said pipe material comprises a kind of steel selected from the group consisting of austenitic stainless steel, ferritic stainless steel, and ferrite-austenite stainless steel.

3. A high nitrogen stainless steel pipe material with ductility, and a corrosion and heat resistance, comprising:
the pipe according to claim 1, the pipe comprising a plurality of pipe members wherein the pipe members are disposed one over another and metallurgically bonded to obtain interfaces between nitrided surfaces of the pipe members and surfaces not undergoing nitriding of the pipe members leading to a united high nitrogen austenite steel pipe material.

4. A product formed of the high nitrogen austenitic stainless steel pipe material having high yield strength, leading to weight reducing and the ductility, and enhancing anti-hydrogen gas embrittlement through stabilization of the austenite phase ascribed to solid solution nitrogen present in said nitrogen-concentration gradient structure, according to claim 1, wherein said product is a high-pressure hydrogen gas container and a liquid hydrogen container which are for fuel cell vehicles or a stainless steel pipe or a hollow material.

5. A high nitrogen stainless steel pipe material with ductility, and a corrosion and heat resistance, comprising:
an austenite steel having a chemical composition comprising Cr, Ni, Mo, C, and Fe (iron), and containing 0.25 to 1.7% (by mass) of solid solution nitrogen including a nitrogen-concentration gradient structure throughout including a surface layer, within a pipe wall in which a concentration of solid solution nitrogen continuously decreases gradually from a surface,
wherein said high nitrogen stainless steel has austenite grains of an order of a few tens of μm refined through a eutectoid transformation of an austenite or refined through a recrystallization of a work-hardened austenite, and
wherein a synergistic effect of the solid solution nitrogen present in said gradient structure combined with crystal grains refined leads to austenite stainless steel pipe materials having a high yield strength and ductility originated from the refined and enhanced crystal grains included in said gradient structure, and extended dislocation containing stacking faults is stabilized to enhance yield strength as well as heat resistance due to the extended dislocation generated in an austenite phase.

6. The high nitrogen stainless steel pipe material with ductility, and a corrosion and a heat resistance according to claim 5, wherein said pipe material comprises a kind of steel selected from the group consisting of austenitic stainless steel, ferritic stainless steel, and ferrite-austenite stainless steel.

7. A high nitrogen stainless steel pipe material with ductility, and a corrosion and heat resistance, comprising:
the pipe consisting of all austenite stainless steel pipe according to claim 5, the pipe comprising a plurality of pipe members, wherein the pipe members are disposed one over another and metallurgically bonded to obtain interfaces between nitrided surfaces of the pipe members and surfaces not undergoing nitriding of the pipe members leading to a united high nitrogen austenite stainless steel pipe material having a predetermined thickness, and having a high yield strength and ductility, with a multi-gradient structure.

8. A product formed of the high nitrogen austenitic stainless steel pipe material having high yield strength leading to weight reducing and ductility, and enhancing anti-hydrogen gas embrittlement through stabilization of the austenite phase ascribed to solid solution nitrogen present in said nitrogen-concentration gradient structure, according to claim 5, wherein said product is a high-pressure hydrogen gas container and a liquid hydrogen container which are for fuel cell vehicles or a stainless steel pipe or a hollow material.

* * * * *